United States Patent [19]
Feigenbaum

[11] Patent Number: 6,038,729
[45] Date of Patent: *Mar. 21, 2000

[54] REPLACEMENT WIPER BLADE

[76] Inventor: Jeffrey J. Feigenbaum, 7339 N. Karlov Ave., Lincolnwood, Ill. 60646

[*] Notice: This patent is subject to a terminal disclaimer.

[21] Appl. No.: 09/049,399

[22] Filed: Mar. 27, 1998

Related U.S. Application Data

[63] Continuation of application No. 08/517,289, Aug. 21, 1995, Pat. No. 5,732,436.

[51] Int. Cl.⁷ ...................................................... B60S 1/38
[52] U.S. Cl. ..................................... 15/250.41; 15/250.48; 524/426; 524/445; 525/237
[58] Field of Search ........................... 15/250.48, 250.41, 15/250.4; 525/215, 236, 237; 524/426, 445

[56] References Cited

U.S. PATENT DOCUMENTS

| | | | |
|---|---|---|---|
| 3,853,809 | 12/1974 | Martin et al. ............................ | 524/544 |
| 3,897,405 | 7/1975 | Son et al. ............................... | 525/331.8 |
| 4,008,190 | 2/1977 | Taylor et al. ............................ | 525/215 |
| 4,861,819 | 8/1989 | Theodore et al. ....................... | 524/491 |
| 4,882,394 | 11/1989 | Kreiner ................................ | 525/332.7 |
| 5,221,828 | 6/1993 | Basheer ............................... | 15/250.05 |
| 5,300,579 | 4/1994 | Aoshima et al. ....................... | 525/290 |
| 5,597,860 | 1/1997 | Aoshima et al. ....................... | 524/505 |
| 5,700,871 | 12/1997 | Arjunan et al. ......................... | 524/74 |
| 5,744,566 | 4/1998 | Tsutsui ................................ | 526/336 |

FOREIGN PATENT DOCUMENTS

| | | | |
|---|---|---|---|
| 711911 | 10/1941 | Germany .............................. | 15/250.41 |

*Primary Examiner*—Gary K. Graham
*Attorney, Agent, or Firm*—John C. Shepard

[57] ABSTRACT

Replacement wiper blades are disclosed which adhere directly to the surface of a pre-existing wiper blade and which have advantageous physical properties. Wiper blades according to the invention are simple to install and may be adapted for use in any vehicle and on front or rear windshields or headlights.

16 Claims, 3 Drawing Sheets

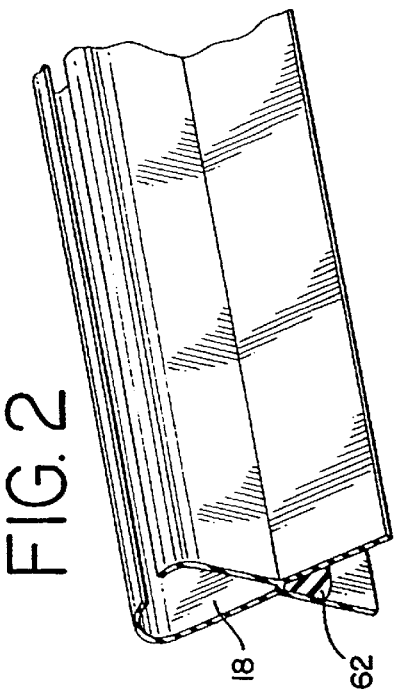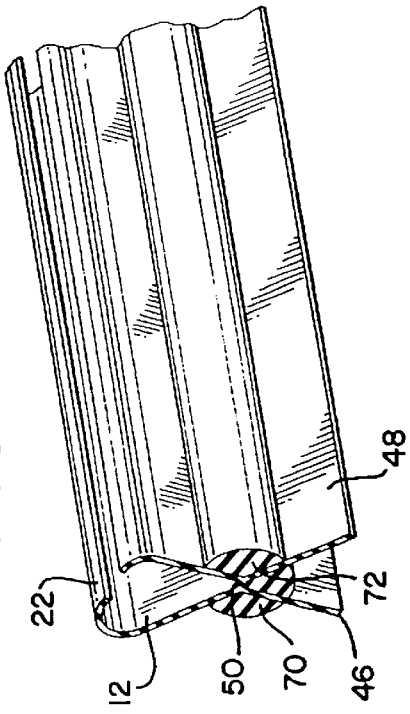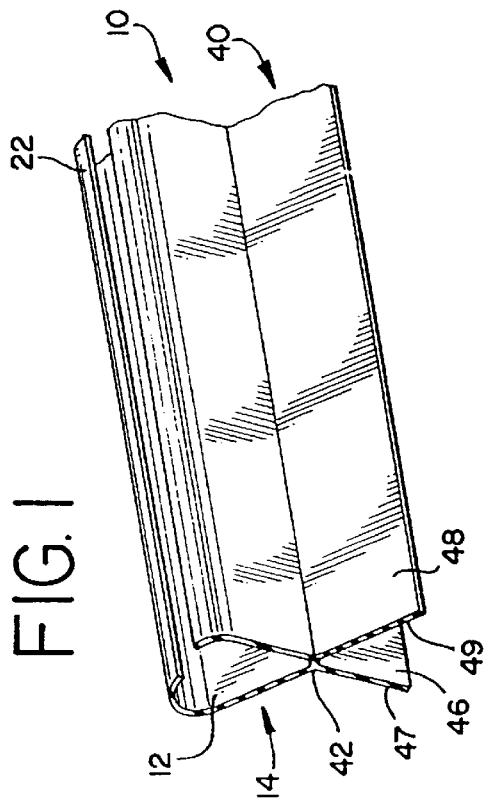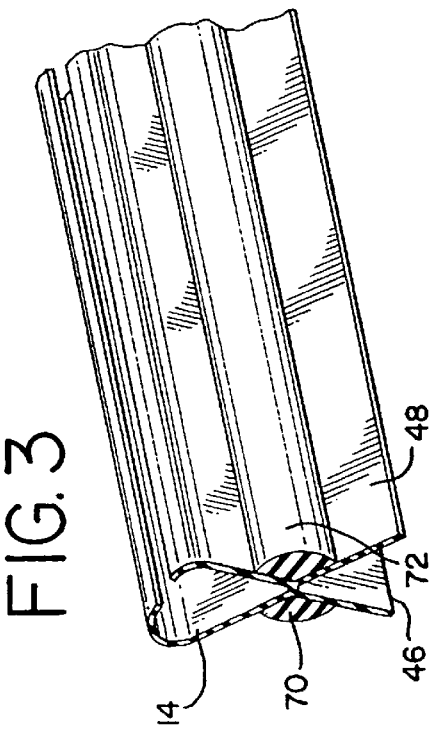

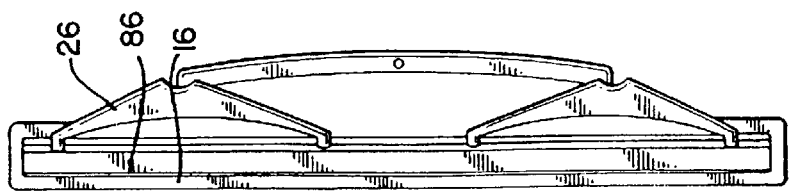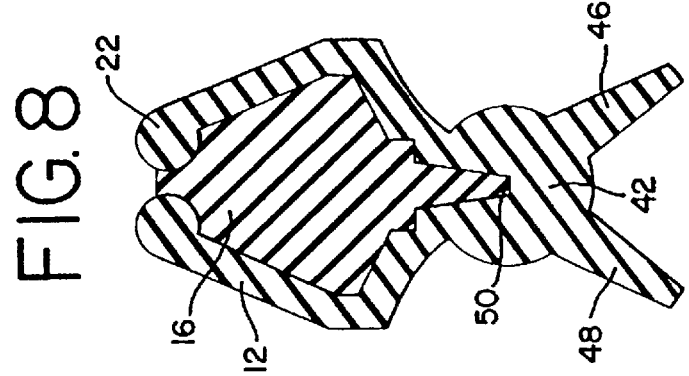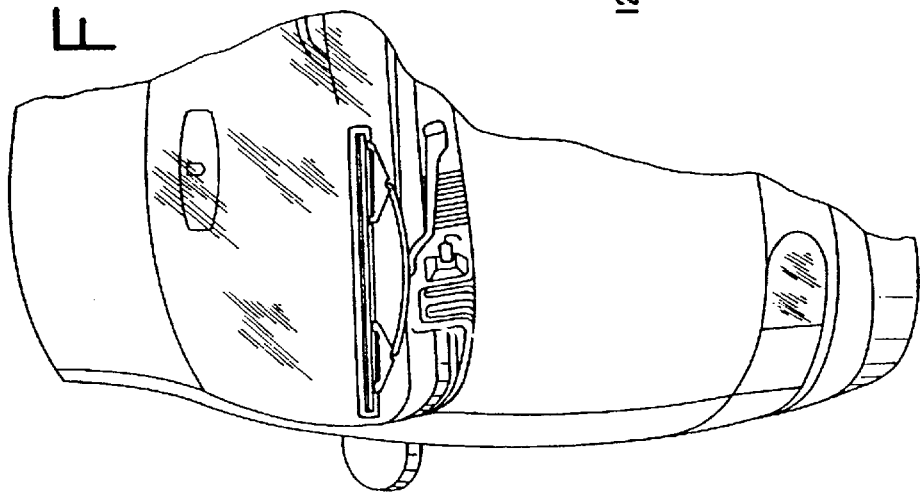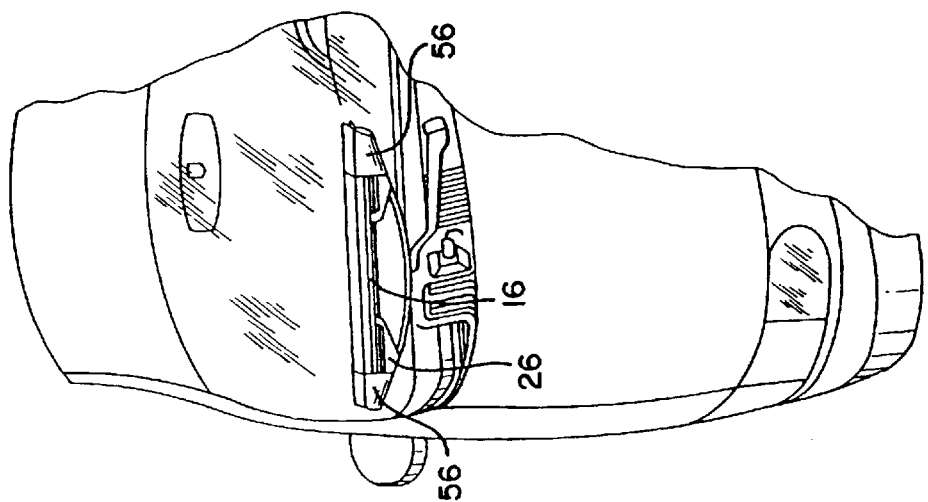

REPLACEMENT WIPER BLADE

This application is a continuation of Ser. No. 08/517,289 filed Aug. 21, 1995, now U.S. Pat. No. 5,732,436.

FIELD OF THE INVENTION

The invention relates to replacements for windshield wiper blades.

BACKGROUND OF THE INVENTION

Conventional windshield wipers in, for example, automobiles include a wiper blade assembly which comprises a flexible, pressure-distributing superstructure having a wiper blade receptacle arm for retaining a replaceable wiper blade refill. The wiper blade generally comprises an elastomeric longitudinal squeegee element defining a narrow longitudinal wiping edge which is attached to the wiper blade receptacle arm. The wiper blade assembly is attached to an oscillating arm extending over at least a portion of the surface to be wiped. A typical wiper blade configuration of this type is shown in FIG. 1 of U.S. Pat. No. 4,271,558.

Improvements in wiper blades usually comprise variations in the shape of the squeegee element, the sides of which may be concave or flat. The means for connecting the wiper blade to the wiper blade receptacle arm on the wiper assembly may vary also. For example, two slotted portions in the receptacle arm may receive stem regions in the wiper blade. (U.S. Pat. No. 4,271,558.)

Commercial wiper blades are usually made of latex rubber or silicone rubber and are not coated. Abrasion of the blade surface generally occurs over time and the rubber also tends to oxidize and become brittle. Accordingly, wiper blades require frequent replacement. Silicone rubber wiper blades, which are considerably more costly than latex rubber wiper blades, require even more frequent replacement than latex rubber due to their relatively poor anti-abrasion characteristics and poor tensile strength.

Wiper blades of the art are difficult to assemble on the wiper blade receptacle arm of the wiper blade assembly. That difficulty is compounded by problems associated with removal of the pre-existing wiper blade from the wiper blade receptacle arm; especially if the screws on the latter have corroded or rusted; or if the receptacle arm is bent, which often happens with prolonged use.

Wiper blades of the art are also generally deficient in that they usually leave streaks on the surface to be wiped, especially in the presence of airborne dirt and oil. Furthermore, they may not fit all wiper assemblies, and they lack durability.

It is apparent from the foregoing that there is a need in the art for inexpensive replacements for worn wiper blades that are durable, resilient, longlasting, effective in removing debris from the windshield without streaking, adaptable to substantially all wiper assemblies and easy to install. Such improvements are provided by the present invention.

SUMMARY OF THE INVENTION

The present invention provides replacements for worn wiper blades. A wiper blade according to the invention comprises a first portion and a second portion. The first portion is adapted to substantially conform to a surface of a pre-existing wiper blade which makes contact with the surface to be wiped. The second portion comprises a first wiping edge and a second wiping edge extending outward to wipe a wet or dirty surface. The first and second wiping edges are each disposed at an angle of from about 30° to about 40° with respect to a midline of the second portion. The first wiping edge contacts the surface to be wiped and acts as a dirt remover and the second wiping edge acts as a squeegee in one direction of blade travel.

In one embodiment, a replacement wiper blade is presented which fits over an existing, used wiper blade that is secured to a wiper blade receptacle arm, the replacement wiper blade comprising a clamp portion having means for securing the wiper blade receptacle arm to the replacement wiper blade, said means defining a recess for receiving at least a portion of the used wiper, and at least one wiping edge joined to and extending outward from the clamp portion.

In another embodiment, the first and second wiping edges are each disposed at an angle of about 33° with respect to the midline of the second portion. It is also preferred that the entire wiper blade insert be coated with an emulsion to reduce friction upon wiping, the emulsion being selected from the group consisting of pure silicone, a wax-polymer blend, and a fully-saturated elastomeric latex emulsion.

In another embodiment according to the invention, a wiper blade comprises a biasing wedge placed between the first and second wiping edges to maintain optimum wiping edge spacing even after extended use. Biasing wedges may also be placed on both outer surfaces of the first and second wiping edges for urging the wiping edges toward the surface to be wiped. Alternatively, wedges may be placed on both outer surfaces of the first and second wiping edges and between the first and second wiping edges to accomplish both of the above objectives simultaneously. A replacement wiper blade according to the invention may comprise only one wiping edge and in that case biasing wedges may be placed in each angle between the wiping edge and the second portion of the replacement wiper blade.

Wiper blades according to the invention may be constructed from natural rubber, synthetic rubber, or a synthetic rubber/natural rubber blend. A particularly preferred rubber for use in the manufacture of wiper blades of the invention is polybutadiene. Other acceptable rubbers include styrene butadiene rubber, ethylene-propylene elastomers (EPR), and polyisoprene. A rubber composition used in the construction of wiper blades of the invention preferably comprises 60–70% and most preferably 66% non-hydrocarbon components, the remainder being hydrocarbon components. The hydrocarbon portion of the composition is preferably between 0% and about 40% natural rubber and between about 60% and about 100% non-latex polymer or co-polymer such as natural rubber, styrene butadiene rubber, acrylonitrile butadiene rubber and preferably polybutadiene rubber.

In another embodiment, a replacement wiper blade of the invention may be attached to a pre-existing wiper blade by an adhesive material, in which case end sleeves are not necessary. An adhesive used in such an embodiment may be any adhesive which binds rubber and may be a tape adhesive or a liquid adhesive applied to the surface of the recess in the replacement wiper blade.

The detailed description which follows provides additional advantages and features of the invention.

BRIEF DESCRIPTION OF THE DRAWINGS

FIG. 1 is a perspective view of a portion of a replacement wiper blade according to the invention;

FIG. 2 is a perspective view of a portion of a replacement wiper blade of the invention having a wedge inserted between first and second wiping edges;

FIG. 3 is a perspective view of a portion of a replacement wiper blade of the invention having wedges placed on an outer surface of each of the first and second wiping edges;

FIG. 4 is a perspective view of a portion of a replacement wiper blade of the invention having wedges placed between the first and second wiping edges and on an outer surface of each of the first and second wiping edges;

FIGS. 7A and 7B show a replacement wiper blade according to the invention mounted on a wiper blade assembly;

FIG. 8 shows a cross-section of a replacement wiper blade of the invention mounted on a pre-existing wiper blade; and FIG. 9 shows a replacement wiper blade according to the invention which is attached to a pre-existing wiper blade by an adhesive.

DETAILED DESCRIPTION OF THE DRAWINGS

Figure 5:
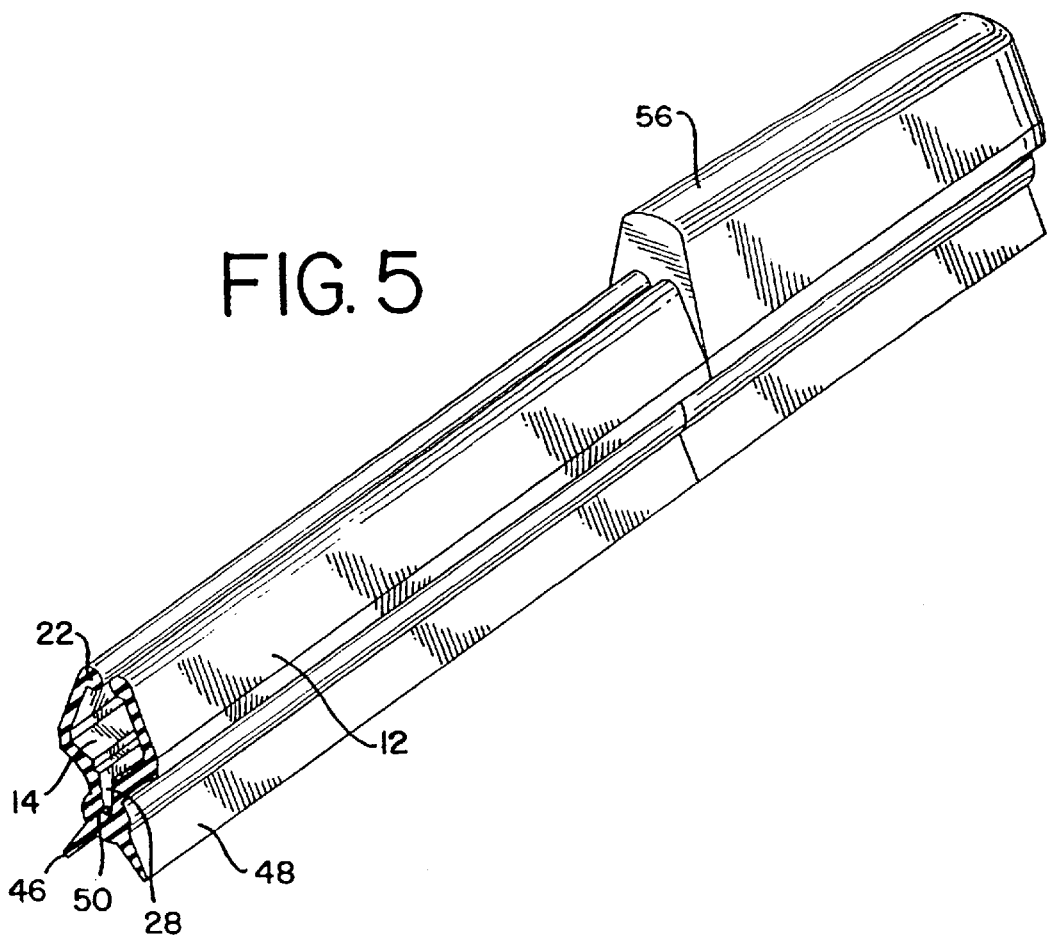
FIG. 5 is a perspective view of a portion of a replacement wiper blade according to the invention with an end sleeve attached.

The present invention provides replacements for worn windshield wipers blades. Replacement wiper blades of the invention may be used on any vehicle having windshield wipers, including, but not limited to, automobiles, motorcycles, trucks, trains, aircraft, military equipment, and boats. Replacement wiper blades of the invention may also be used on, for example, headlight wiper systems. The invention presents numerous advantages over the art. For example, replacement wiper blades in accordance with the present invention minimize excessive streaking and smearing relative to most conventional wiper blades. Replacement wiper blades of the invention also clear debris from the windshield in addition to providing a squeegee function to clear water from the windshield. Replacement wiper blades of the invention are installed by either stretching the blade over the length of the preexisting wiper blade and inserting the wiper blade receptacle arm into end sleeves at each longitudinal end of the blade or by direct application of the replacement wiper blade using an adhesive. Inventive replacement wiper blades are also durable and relatively inexpensive to produce. Replacement wiper blades may be mhade of natural rubber, synthetic rubber or natural rubber/synthetic rubber polymers.

An emulsion applied to replacement wiper blades of the invention renders the wiping edge or edges of the blade smooth, thereby greatly reducing the friction normally generated at the interface of the wiping edge and the glass surface to be wiped. Consequently, replacement wiper blades of the invention last longer than conventional blades. Inventive replacement wiper blades prevent streaking due to dullness and abrasion of the tip and prolong the resilience and effective lifetime of the blade.

To the extent reasonable and practical, the same reference characters will be used to identify the same or similar elements in each of the figures. Depicted in FIG. 1 and generally referred to by the numeral 10, is a replacement wiper blade in accordance with the present invention shown without end sleeves attached. The wiper blade 10 comprises an upwardly extending resilient clamp portion 12 which defines a recess 14 for receiving an existing wiper blade 16 (FIG. 8) that no longer performs as desired. The recess 14 may be oversized, preformed, or defined by resilient walls 18 (FIG. 2) that conform to the existing wiper blade's 16 shape.

The clamp portion 12 further includes upwardly extending resilient clamp arms 22 that are sized, shaped, or otherwise adapted to be deformed and pushed over the used wiper blade 16 (and even a receptacle arm, not shown) and resiliently snap or otherwise return to their undeformed shape to entrap the blade 16 and/or receptacle arm 26 (FIG. 7A) in a slot 28 defined by the clamp arms 22. Like the recess 14 that receives the existing wiper blade, the slot 28 may be performed, oversized, or defined by resilient walls 18 that conform to the shape of the receptacle arm 26.

The lower portion of the wiper blade 10 is referred to generally by numeral 40. The lower portion 40 includes a spine 42 that is preferably rigid enough to resist twisting, tension, and other forces resulting from wiper use. As illustrated, the spine 42 is generally cylindrical in shape, although other shapes can be used and reinforcing materials can be inserted into or molded integrally with the spine to increase its strength (see below).

Figure 6:
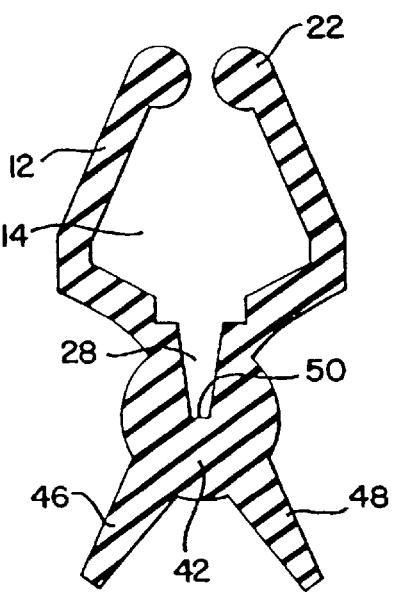
FIG. 6 shows a cross-section of a replacement wiper blade according to the invention.

Extending downward from the spine 42 are two cantilevered wipers, in particular, a first wiper 46 and a second wiper 48. The wipers are sized and resiliently adapted so that they will make wiping contact with the surface to be wiped along most or all of their length. The cross-section of the wipers is preferably frustroconical with opposite faces defining an angle of preferably seventeen degrees with respect to one another (FIGS. 6 and 8).

The spine 42 further defines a midline 50 that is either molded into the spine, marked on the spine, or is simply imaginary. In most embodiments the midline 50 (FIGS. 4 and 8) win bisect the wiper blade 10 into two symmetrical halves and define an angle of about 90° with a line tangent to the surface to be wiped.

The downwardly extending first and second wipers 46 and 48 each have bisecting lines of their own 47 and 49, respectively, which each define an angle between 30° and 45° with respect to the spine's midline 50. Both angles may be the same or they may be different from one another. A preferable wiper angle is 33 degrees.

As best seen in FIG. 5, the replacement wiper blade 10 may also include an end sleeve 56 at each end which is molded integrally with the replacement wiper blade 10 and which secures the wiper blade 10 to the receptacle arm 26. The end sleeve 56 is preferably constructed of a resilient material that is stretched over the wiper blade 10 and released for binding security. The end sleeve 56 may simply encapsulate the clamp arms 22 to prevent them from opening and releasing the receptacle arms 26, or the end sleeves may have a lower portion of a size and shape necessary to match or conform to the lower portion 40 of the wiper blades 10 (not shown). The end sleeve 56 itself may contact the surface to be wiped to enhance the performance of the wiper blade 10. A replacement wiper blade according to the invention may be made in any suitable length. However, replacement wiper blades according to the invention are preferably made from a highly elastic rubber with an elongation of approximately 650%. Thus, a 16-inch long replacement wiper blade fits a preexisting wiper blade from 18 inches to about 20 inches in length. The blade itself, not only the end sleeves, stretches to accommodate the used wiper.

Replacement wiper blades 10 according to the invention may also include a central wedge 62 positioned between the first and second wipers 46 and 48, shown in FIGS. 1 through 4. The wedge 62 can run the entire longitudinal aspect of the wipers 46 and 48 in the angle formed therebetween as shown in FIG. 2 or the wedge is placed along an entire longitudinal surface of the first and second wiping edges at the point of confluence between the first surface and second surface. The wedge 62 may be made from any durable rubber or rubber composite material (i.e. a natural rubber-synthetic rubber copolymer) or the same material used to construct the replacement wiper 10 itself. The wedges 62 increases the stability and useful life of the first and second wipers 46 and 48 by reducing the cantilevered length of the wipers and, thus the stresses induced therein. The wedge 62 also absorbs shocks that would otherwise be borne entirely by the wipers 46 and 48.

Likewise, first and second lateral wedges 70 and 72, are sized and shaped to provide additional stability and useful life to wipers 46 and 48. The lateral wedges 70 and 72 may be used in conjunction with the central wedge 62 (FIG. 4) or without a central wedge (FIG. 3) depending upon the necessary length, cross-sectional shape, and materials of the first and second wipers 46 and 48. Further, the wedges may all be molded or extruded integrally with the other components of the replacement wiper blade 10. Reinforcing stays (not illustrated) of metal, rigid plastic, or other suitable material may be added to the wedges to provide additional support.

When the replacement wiper blade 10 is moving from right to left, the first wiper 46 functions to remove debris from the windshield and the second wiper 48 functions as an elastomeric squeegee element traditionally associated with wiper blades. Each wiper is angled to obtain maximum mechanical advantage which results in more uniform pressure of the wiper on the windshield to prevent streaking, smearing, and accumulation of debris. When the blade 10 is moving left to right, the wiping edges have the opposite function. The mechanical advantage possessed by wiper blades of the art is approximately less than 1.0 due to friction. Mechanical advantage is represented as $(\sin \theta)^{-1}$ where $\theta$ is the angle of the blade with respect to the windshield. See, *Principles of Physics*, Greene (Prentice Hall, 1962) 133. Most conventional wiper blades are disposed at an angle of about 90° with respect to the windshield. That leads to a mechanical advantage of 1.0 (1/sin 90°) which is further reduced by friction due, in part, to the accumulation of debris on the windshield. The wipers of replacement wiper blades of the invention are disposed at an angle of between about 30° and about 40° with respect to the windshield, the most preferred angle being about 33°. Thus, mechanical advantage is 1.86 for an angle of 33° and the effects of friction are reduced due to the use of a dual wiping edge system and a friction reducing emulsion discussed below. The rigidity of the wipers as well as the shape of their tips, play a role in increased mechanical advantage of wiper blades of the invention. The first wiper 46 removes debris which allows the second wiper 48 to act as a more efficient squeegee under reduced friction. Increased mechanical advantage also allows more force to be imparted on the windshield, further aiding removal of water and debris.

The first and second wipers 46 and 48 of replacement wiper blades 10 of the invention are preferably coated to reduce friction and increase useful life. Preferred coatings are shown below in Table 1. The coating provides a seal which retards oxidation and degradation of the rubber due to environmental conditions. The coating also allows the wiping tip to move smoothly across the surface of the windshield which further reduces friction and which prevents streaking. The coating is applied in liquid form by, for example, dipping the replacement wiper blade into a reservoir containing the coating and allowing the coating to air dry. Alternatively, the coating is applied by brushing it onto the surface of the wiping edges. The entire replacement wiper blade may be coated, but it is preferable that at least the first and second wiping edges be coated.

TABLE 1

COATINGS FOR REPLACEMENT WIPER BLADES

| Coating | Example | Composition |
|---|---|---|
| Pure Silicone | Kel 110 | Dimethysiloxane; heptane (solvent) |
| Wax, polymer blend | Taski Wiwax ™ | Styrene acrylic polymer, wax emulsion, ethylene glycol, nonylphenol polyethylene, glyco ether, water |
| Fully saturated elastomeric latex emulsion | BF Goodrich Hystretch V-29; 43 | acrylamide, ethyl acrylate, ammonium-OH, formaldehyde, water, latex polymer, and N-methylol-acrylamide |

Replacement wiper blades 10 according to the invention are preferably constructed from rubber. Preferred rubbers are natural rubber and styrene-butadiene rubber or a polymeric mixture of natural rubber and styrene-butadiene rubber. A highly preferred rubber for use in making replacement wiper blades of the invention is polybutadiene rubber.

Rubber used in the manufacture of replacement wiper blades of the invention consists of two primary fractions, a hydrocarbon fraction and a non-hydrocarbon fraction. The latter generally comprises from about 60% to about 70% of the composition and preferably about 66% of the composition. The remaining hydrocarbon fraction comprises from about 0% to about 40% and most preferably from about 3% to about 10% natural rubber, the rest of the hydrocarbon fraction being a copolymer, such as styrene butadiene, acrylonitrile butadiene or polybutadiene. Two highly preferred rubber compositions are shown in Tables 2 and 3 below:

TABLE 2

| Polymer Fraction | |
|---|---|
| EP-BR (or either SBR or EPR) | 95 parts |
| NR | 5 parts |
| or NR | 100 parts |
| Non-Polymer Fraction | |
| Hard clay | 45–55 parts |
| Carbon black (highly reinforced; 1502 grade) | 18–28 parts |
| Calcium carbonate (precipitated) | 13–17 parts |
| Oil | 15–25 parts |
| Zinc oxide | 5 parts |
| Sulfur | 2.5 parts |
| Stearic acid | 1–1.5 parts |
| Accelerator (tetramethioram disulfide; TMTD) | 1–1.5 parts |
| Anti-oxidant ([para]phenylene diamer) | .5–1.5 parts |
| MBTS | <0.5 parts |

The polymer fraction is 30 to 35% of the total fraction of the rubber.

TABLE 3

| Polymer Fraction | |
|---|---|
| Styrene | 23–24 parts |
| Butadiene | 69–72 parts |
| Natural rubber | 4–7 parts |
| Non-Polymer Fraction | |
| Carbon black | 28–33 parts |
| Oil | 27–32 parts |

TABLE 3-continued

| | |
|---|---|
| Hard Clay | 23–25 parts |
| Zinc Oxide | 2–5 parts |
| Sulfur | 1–3 parts |
| Stearic Acid | 0.5–1.5 parts |
| Anti-oxidant | 0.5–1.5 parts |
| Accelerators | 0.1–1.5 parts |

The polymer fraction is 30 to 35% of the total. Each fraction comprises 100 parts.

As shown in FIG. 9, replacement wiper blades of the invention may also be applied to a pre-existing wiper blade by affixing an adhesive to the surface 86 of the replacement wiper blade which is to be attached to the pre-existing wiper blade. Such a blade comprises a concave logitudinal surface for receiving the used wiper; and adhesive permanently affixed to the concave logitudinal surface, and one or more wipers. A removable backing which covers the adhesive may be used to expose the adhesive for direct application of the replacement wiper blade to a pre-existing wiper blade. In such a case, the resilient clamp portion 12 is optional. The adhesive may be any adhesive which bonds to natural or synthetic rubber. However, it is preferable that an adhesive tape, such as 3M VHB 4950 or similar brand, be used in conjunction with a primer, such as an acrylic base primer, which aids in the attachment of the adhesive to the rubber or synthetic rubber replacement wiper blade. Alternatively, the adhesive may be a liquid or semi-liquid adhesive which is directly applied to the replacement blade. A typical acrylic base primer for use in adhesive application to inventive replacement wiper blades is Hystretch V29™ acrylic base polymer coating. The adhesive is preferably an approximately 0.25 inch wide tape, such as 3M VHB4950 or similar brand, which is covered with a strip of silanized paper. When the strip of silanized paper is removed, the adhesive is exposed for bonding of the replacement wiper to the pre-existing blade. In order to apply a tape adhesive it is necessary to first apply a primer in order to cause bonding between the replacement wiper and the tape. A commercial primer, such as 3M tape primer 94 may be used. A preferred primer has the following constituents:

| | |
|---|---|
| cyclohexane | 45–55% by weight |
| xylene | 25–35% by weight |
| ethyl alcohol | 5–10% by weight |
| ethylbenzene | 3–7% by weight |
| ethyl acetate | 1–5% by weight |
| acrylic polymer | 1–5% by weight |
| chlorinated polyolefins | .5–1.5% by weight |
| toluene | 0.1–.5% by weight |
| vinylcaprolactam | less than .02% by weight |

Other primers known to the skilled artisan, such as a primer comprising methylene chloride (55–60%), isobutane (15–20%), propane (5–10%), glycerol ester (6–8%), toluene (6–8%), styrene-butadiene copolymer (2–4%), and β-pinene, α-pinene-dipentene, β-phellandrene polymer (2–4%) (all percentages are weight percent) may also be used.

The present invention has been described in terms of its preferred embodiments. Numerous advantages and additional embodiments of the invention are apparent to the skilled artisan upon consideration of the foregoing Specification. Accordingly, the scope of the invention is intended to be limited only by the appended claims.

I claim:

1. A replacement wiper blade fitting over and secured to an existing used wiper blade which has first and second free end portions attached to respective first and second ends of an elongated receptacle arm, the replacement wiper blade comprising an elongated body having first and second opposing ends, the body including an elongated spine, first and second clamp arms initially divergently extending from the spine and converging towards one another and terminating in spaced enlarged free ends, the clamp arms defining an entrance to an elongated recess defined by the clamp arms and the spine, the recess in part formed by an elongated slot in the spine with the recess receiving and securing the existing wiper blade therein with the tip of the existing wiper blade disposed in said slot, first and second wiper blade lips extending laterally from the spine and in opposing relation to the clamp arms, and first and second end sleeves adjacent the first and second ends thereof, the end sleeves defining first and second encapsulating regions having a resilient portion extending between and connecting the clamp arms to receive and enclose the first and second ends of the receptacle arm respectively, the encapsulating region resilient portions being dimensionally sized slightly smaller relative to the existing blade and the receptacle arm to frictionally engage and maintain contact with the end portions of the existing blade and the ends of the receptacle arm positioned respectively therewithin to securely mount the replacement wiper blade to the existing wiper blade and the receptacle arm.

2. The replacement wiper blade in accordance with claim 1 wherein the clamp arms each include a converging portion distal of the spine, the converging portions defining an enclosed region within the recess having an entrance having a width that is smaller than a maximum width across the clamp arms at a divergent most location.

3. The replacement wiper blade in accordance with claim 2 wherein the free ends of the clamp arms are in opposing relation to a juncture of the clamp arms and the spine, and wherein the free ends of the clamp arms each include a longitudinally oriented bead formed thereon.

4. The replacement wiper blade in accordance with claim 1 wherein the wiper blade lips extend divergingly from the spine and define an angle of between about 60 degrees and 80 degrees therebetween.

5. The replacement wiper blade in accordance with claim 4 wherein the wiper blade lips extend symmetrically from the spine.

6. The replacement wiper blade in accordance with claim 1 further including an axis of symmetry passing though said spine and recess and wherein the lips extend laterally from the spine on opposite sides of said axis at an angle of between 30 degrees and 40 degrees relative to said axis.

7. A replacement wiper blade fitting over and secured to an existing used wiper blade which has first and second free end portions attached to respective first and second ends of an elongated receptacle arm, the replacement wiper blade comprising an elongated body having first and second opposing ends, the body including an elongated spine, first and second clamp arms divergently extending from the spine, the clamp arms defining an entrance to an elongated recess defined by the clamp arms and the spine, the recess being adapted to receive and secure the existing wiper blade therein, the spine having a substantially cylindrical cross-section defining a slot therein at about a juncture of the clamp arms adapted to receive and secure therein a tip of the existing wiper blade, first and second wiper blade lips extending laterally from the spine and in opposing relation to the clamp arms, and first and second end sleeves adjacent the first and second ends thereof, the end sleeves defining first and second encapsulating regions having a resilient portion extending between and connecting the clamp arms to securely mount the replacement wiper blade to the existing wiper blade and the receptacle arm.

8. A replacement wiper blade fitting over and secured to an existing used wiper blade which has first and second free end portions attached to respective first and second ends of an elongated receptacle arm, the replacement wiper blade comprising an elongated body having first and second opposing ends, the body including an elongated spine, first and second clamp arms divergently extending from the spine, the clamp arms defining an entrance to an elongated recess defined by the clamp arms and the spine, the recess being adapted to receive and secure the existing wiper blade therein, first and second wiper blade lips extending laterally from the spine and in opposing relation to the clamp arms, a biasing wedge disposed adjacent the spine between the first and second wiper blade lips, and first and second end sleeves adjacent the first and second ends thereof, the end sleeves defining first and second encapsulating regions having a resilient portion extending between and connecting the clamp arms to securely mount the replacement wiper blade to the existing wiper blade and the receptacle arm.

9. A replacement wiper blade fitting over and secured to an existing used wiper blade which has first and second free end portions attached to respective first and second ends of an elongated receptacle arm, the replacement wiper blade comprising an elongated body having first and second opposing ends, the body including an elongated spine, first and second clamp arms divergently extending from the spine, the clamp arms defining an entrance to an elongated recess defined by the clamp arms and the spine, the recess being adapted to receive and secure the existing wiper blade therein, first and second wiper blade lips extending laterally from the spine and in opposing relation to the clamp arms, and first and second end sleeves adjacent the first and second ends thereof, the end sleeves defining first and second encapsulating regions having a resilient portion extending between and connecting the clamp arms to receive and enclose the first and second ends of the receptacle arm respectively, the encapsulating region resilient portions being dimensionally sized slightly smaller relative to the existing blade and the receptacle arm to frictionally engage and maintain contact with the end portions of the existing blade and the ends of the receptacle arm positioned respectively therewithin to securely mount the replacement wiper blade to the existing wiper blade and receptacle arm, the replacement wiper blade being formed from an admixture of a polymer fraction and a non-polymer fraction selected from the group consisting of A and B, wherein A is a polymer fraction comprising between about 30 and 35 percent by weight of the admixture and including up to about 95 parts by weight of one of ethylene-propylene-elastomers, polyisoprene rubber, styrene-butadiene rubber and polybutadiene rubber, and up to about 100 parts by weight natural rubber, and a non-polymer fraction comprising between about 65 percent and about 70 percent by weight of the admixture, and wherein B is a polymer fraction comprising between about 30 percent and about 35 percent by weight of the admixture and including between about 23 parts and about 24 parts by weight styrene, between about 69 parts and about 72 parts by weight butadiene, between about 4 parts and about 7 parts by weight natural rubber, and a non-polymer fraction comprising between about 65 percent and about 70 percent by weight of the admixture.

10. The replacement wiper blade in accordance with claim 9 wherein the non-polymer fraction of B includes at least one of between about 28 and about 33 parts by weight carbon black, between about 27 parts and about 32 parts by weight oil, between about 23 parts and about 25 parts by weight hard clay, between about 2 parts and about 5 parts by weight zinc oxide, between about 1 parts and about 3 parts by weight sulfur, between about 0.5 parts and about 1.5 parts by weight stearic acid, between about 0.5 parts and about 1.5 parts by weight anti-oxidant, and between about 0.1 and about 1.5 parts by weight accelerator.

11. The replacement wiper blade in accordance with claim 9 wherein the clamp arms each include a converging portion distal of the spine, the converging portions defining an enclosed region within the recess having an entrance having a width that is smaller than a maximum width across the clamp arms at a divergent most location.

12. The replacement wiper blade in accordance with claim 11 wherein the free ends of the clamp arms are in opposing relation to a juncture of the clamp arms and the spine, and wherein the free ends of the clamp arms each include a longitudinally oriented bead formed thereon.

13. The replacement wiper blade in accordance with claim 9 wherein the wiper blade lips extend divergingly from the spine and define an angle of between about 60 degrees and 80 degrees therebetween.

14. The replacement wiper blade in accordance with claim 13 wherein the wiper blade lips extend symmetrically from the spine.

15. A replacement wiper blade fitting over and secured to an existing used wiper blade which has first and second free ends attached to respective first and second ends of an elongated receptacle arm, the replacement wiper blade comprising an elongated body having first and second opposing ends, the body including an elongated spine, first and second clamp arms divergently extending from the spine, the clamp arms defining an entrance to an elongated recess defined by the clamp arms and the spine, the recess being adapted to receive and secure the existing wiper blade therein, the spine having a substantially cylindrical cross-section defining a slot therein at about a juncture of the clamp arms adapted to receive and secure therein a tip of the existing wiper blade, first and second wiper blade lips extending laterally from the spine and in opposing relation to the clamp arms, and first and second end sleeves adjacent the first and second ends thereof, the end sleeves defining first and second encapsulating regions having a resilient portion extending between and connecting the clamp arms to securely mount the replacement wiper blade to the existing wiper blade and the receptacle arm, the replacement wiper blade being formed from an admixture of a polymer fraction and a non-polymer fraction selected from the group consisting of A and B, wherein A is a polymer fraction comprising between about 30 and 35 percent by weight of the admixture and including up to about 95 parts by weight of one of ethylene-propylene-elastomers, polyisoprene rubber, styrene-butadiene rubber and polybutadiene rubber, and up to about 100 parts by weight natural rubber, and a non-polymer fraction comprising beteen about 65 percent and about 70 percent by weight of the admixture, and wherein B is a polymer fraction comprising between about 30 percent and about 35 percent by weight of the admixture and including between about 23 parts and about 24 parts by weight styrene, between about 69 parts and about 72 parts by weight butadiene, between about 4 parts and about 7 parts by weight natural rubber, and a non-polymer fraction comprising between about 65 percent and about 70 percent by weight of the admixture.

16. A replacement wiper blade fitting over and secured to an existing used wiper blade which has first and second free ends attached to respective first and second ends of an elongated receptacle arm, the replacement wiper blade comprising an elongated body having first and second opposing ends, the body including an elongated spine, first and second clamp arms divergently extending from the spine, the clamp arms defining an entrance to an elongated recess defined by the clamp arms and the spine, the recess being adapted to receive and secure the existing wiper blade therein, first and second wiper blade lips extending laterally from the spine and in opposing relation to the clamp arms, a biasing wedge disposed adjacent the spine between a wiper blade lip and an adjacent clamp arm, and first and second end sleeves adjacent the first and second ends thereof, the end sleeves defining first and second encapsulating regions having a resilient portion extending between and connecting the clamp arms to securely mount the replacement wiper blade to the existing wiper blade and the receptacle arm.

* * * * *

UNITED STATES PATENT AND TRADEMARK OFFICE
CERTIFICATE OF CORRECTION

| | |
|---|---|
| PATENT NO. : 6,038,729 | Page 1 of 1 |
| DATED : March 21, 2000 | |
| INVENTOR(S) : Jeffrey J. Feigenbaum | |

It is certified that error appears in the above-identified patent and that said Letters Patent is hereby corrected as shown below:

<u>Title page,</u>
Item [76], should read as follows: --Jeffrey J. Feigenbaum--

Signed and Sealed this

Fourteenth Day of August, 2001

*Attest:*

*Nicholas P. Godici*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,038,729
DATED : March 21, 2000
INVENTOR(S) : Jeffery J. Feigenbaum It is certified that error appears in the above-identified patent and that said Letters Patent is hereby corrected as shown below:

<u>Title page,</u>
Item [76], should read as follows: -- Jeffery J. Feigenbaum --

This certificate supercedes certificate of correction issued August 14, 2001

Signed and Sealed this

Thirteenth Day of November, 2001

Attest:

*Nicholas P. Godici*

NICHOLAS P. GODICI
*Acting Director of the United States Patent and Trademark Office*

*Attesting Officer*